Sept. 5, 1967  M. P. DOYLE  3,339,290
INJECTION TRAINING DEVICE
Filed June 22, 1965
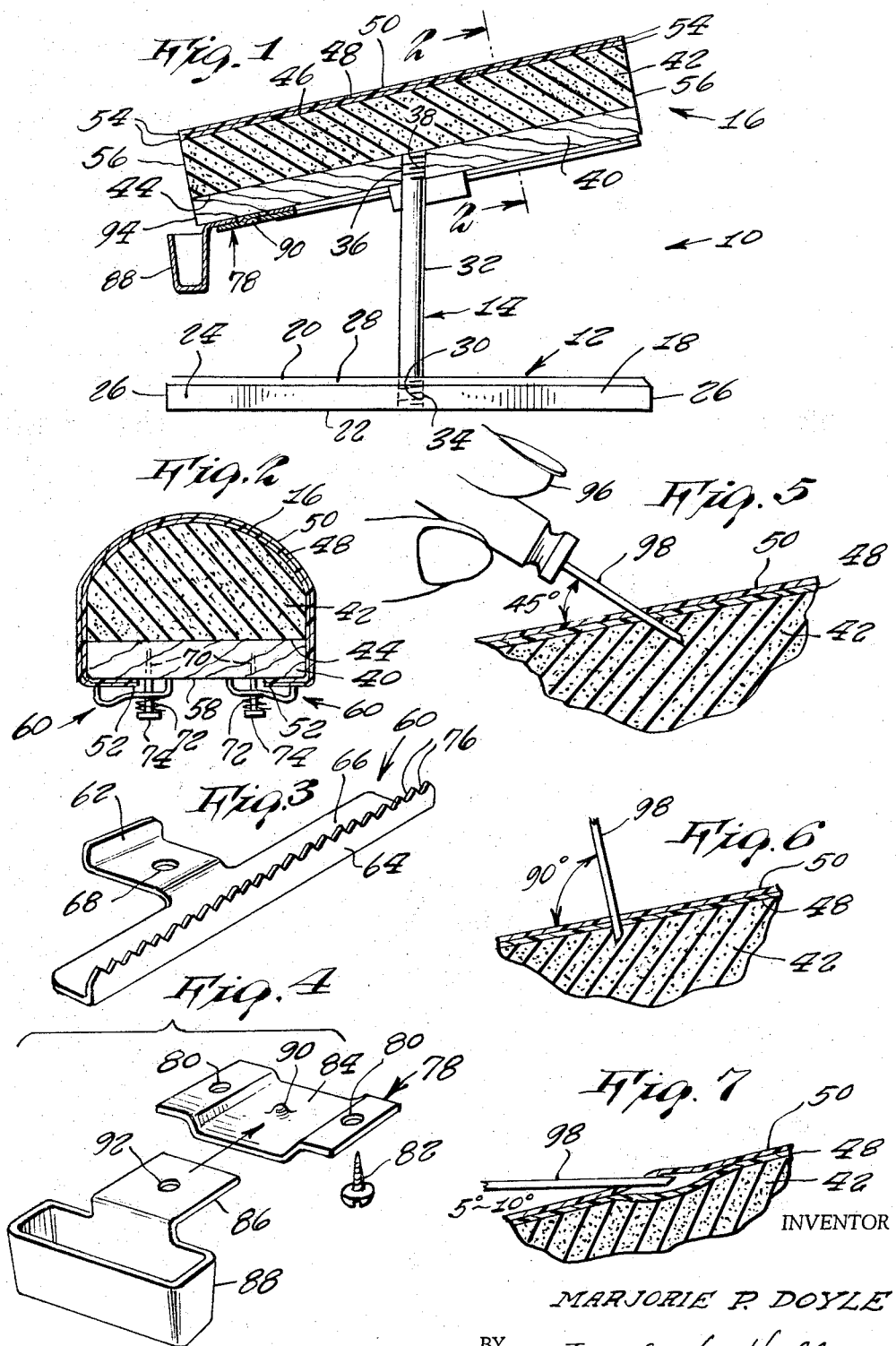
INVENTOR
MARJORIE P. DOYLE
BY Jacob L. Kollin
ATTORNEY 3,339,290
INJECTION TRAINING DEVICE
Marjorie P. Doyle, 83 Elliot Ave.,
Centereach, N.Y. 11720
Filed June 22, 1965, Ser. No. 466,033
1 Claim. (Cl. 35—17)

ABSTRACT OF THE DISCLOSURE

A simulated section of a human arm is mounted on an inclined panel secured to a post; consists of an outer sheet and an inner sheet of plastic simulating the outer and inner layers of skin and sponge material simulating a muscle. A tray for catching fluid from hypodermic needles injected into the simulated arm section is secured below the lower end of the panel.

---

This invention relates generally to training apparatus for medical students. More specifically it relates to apparatus for the training of injection techniques.

It is generally well known to those skilled in the art that the application of an injection to a patient requires experience for proper result with minimum pain, and such experience is advantageous to be had before actual practice on living patients. There are several types of injections and the technique for each is different. There is a subcutaneous injection wherein the hypodermic needle is introduced into the patient at a 45° angle relative to the skin surface; there is and intramuscular injection made at a 90° angle; and there is an intradermal injection made at a 5 to 10° angle. In the first two types of injections the needle penetration is through both layers of skin whereas in the last type the needle penetration is only through the outer layer of skin. The ability to perform the various types with competence is accordingly highly desirable.

Accordingly, it is a principal object of the present invention to provide an injection training device for use by nurses or other medical students wherein the various type of injection techniques can be skillfully mastered before the student actually performs such service on living patients. Thus the patient is not subject to an improperly made injection and its resultant possible ineffectiveness as well as greater pain caused by incompetent administering.

Another object of the present invention is to provide an injection training device wherein the construction includes elements which imitate a portion of the human or animal anatomy and wherein the outer and inner layers of skin are imitated in texture or "feel" and in thickness, and wherein the muscle is imitated in resilience.

Other objects are to provide an injection training device which is of simple design, inexpensive to manufacture, rugged in construction, easy to use and efficient in operation.

These and other objects will be readily apparent upon a study of the following specification and the accompanying drawing wherein:

FIG. 1 is a side elevation view of the present invention shown partly in cross-section;

FIG. 2 is an enlarged cross-section view taken on line 2—2 of FIG. 1;

FIG. 3 is a perspective view of a clamp which forms a part of the present device;

FIG. 4 is an exploded view of a tray and tray bracket, which form a portion of the present device;

FIG. 5 is an enlarged fragmentary side cross-sectional view showing performance of a subcutaneous injection on the present device;

FIG. 6 is a similar view showing performance of an intramuscular injection and

FIG. 7 is a similar view showing performance of an intradermal injection.

Referring now to the drawing in detail the numeral 10 represents an injection training device according to the present invention, wherein there is a base 12, a upstanding stanchion or post 14 and an arm 16.

The base 12 may be composed of wooden panel 18 of rectangular or other configuration having an upper side 20, a lower side 22, side edges 24 and end edges 26. A peripheral bevel 28 may be made to provide softness to the feel. A vertical opening 30 is made through the center of the panel and may be threaded.

The post 14 comprises a dowel 32 made preferably from turned wood and being threaded at each opposite end 34 and 36 for being received within opening 30 of the base and within opening 38 of the arm 16 mounted at an angle thereupon.

The arm 16 has a wooden rectangular panel 40 having opening 38 centrally diagonally therethrough. A body of sponge material 42 is positioned over the top of the panel 40, the body being of generally semicylindrical configurations and having a flat bottom wall 44 which is of a length and width equal to the dimensions of the panel 40. Over the top of semicylindrical side 46 a lower sheet 48 and an upper sheet 50 of plastic materials is positioned. The sheets are of rectangular configuration, having side edges 52 and end edges 54. The end edges 54 are in alignment with flat ends 56 of the body 42 whereas the side edges 52 extend downward around to the underside 58 of the panel 40 where the edges are each held captive by a clamp 60. The clamp is of generally U-shaped character having upstanding opposite sides 62 and 64, the latter of which is toothed to assure a firm grip of the side edges 52 of the sheets 48 and 50. An intermediate wall 66 between sides 62 and 64 has an opening 68 to permit mounting of the clamp upon a nail 70 affixed to the underside of panel 40. A compression coil spring 72 is fitted on nail 70 between the clamp and nail head 74 to normally urge the teeth 76 of the clamp against the panel 40 thus securely holding the side edges of the sheets. A tray bracket 78 having openings 80 for receiving screws 82 is mounted on the underside of panel 40; the bracket having a central downward depression 84 into which a tongue 86 of a tray 88 is slidable, the upper side of the tongue being adjacent the underside of panel 40. An upward extending detent 90 formed in the bracket is engageable in an opening 92 in the tongue to provide frictional securement of the tray to the bracket.

It is to be noted that the tray is of a width equal to the width of the panel 40 and it is positioned below the lower end edge 94 thereof so as to catch any liquid drifting therefrom.

In operative use the student 96 can introduce the hypodermic needle 98 through the sheets 48 and 50 which represent inner and outer skins respectively according to the type of injection being practiced (and as shown in FIGS. 5, 6 and 7). He then releases the injection fluid from the hypodermic needle into the arm to simulate the actual operation. The released injection fluid eventually drips down into the tray 88 which can be removed for being emptied of fluid when necessary.

Thus a novel method for learning injection techniques has been provided wherein the actual anatomy of the body has been simulated for attaining correctness of the operation.

While various changes may be made in the detail construction, it is understood that such changes will be in the spirit and scope of the present invention as is defined in the appended claim.

I claim:

In an injection training device, the combination of a base, a vertical upstanding post centrally mounted on said base, and an arm angularly mounted on said post, said arm simulating the construction of the human or animal anatomy, said anatomy including the inner and outer layers of skin and a muscle adjacent said inner layer of skin, said simulated anatomy comprising an outer sheet of plastic simulating said outer layer of skin, an inner sheet of plastic simulating said inner layer of skin, a sponge material simulating said muscle, said arm comprising a panel mounted on said post, said sponge material being positioned on said panel, said inner plastic sheet being positioned over said sponge material, said outer plastic sheet being positioned over said inner plastic sheet, said panel being of rectangular configuration, said sponge material being of semi-cylindrical configuration having a flat side adjacent said panel and a semi-cylindrical side adjacent to said inner sheet, said sheets being of rectangular configuration having side edges extending under said panel, clamp means on the under side of said panel to secure said sheet edges, and a tray removably secured below a lower end of said angularly mounted arm to catch fluid from hypodermic needles injected into said arm.

References Cited

UNITED STATES PATENTS

| | | | |
|---|---|---|---|
| 2,704,897 | 3/1955 | Lade | 35—17 |
| 2,871,579 | 2/1959 | Niiranen et al. | 35—17 |
| 2,871,584 | 2/1959 | Poole | 35—17 |

FOREIGN PATENTS 147,832  9/1931  Switzerland.

EUGENE R. CAPOZIO, *Primary Examiner.*

H. SKOGQUIST, *Assistant Examiner.*